Sept. 16, 1947.  G. L. DIMMICK  2,427,592
THORIUM COMPOUND PROTECTIVE COATINGS FOR REFLECTING SURFACES
Filed July 31, 1943
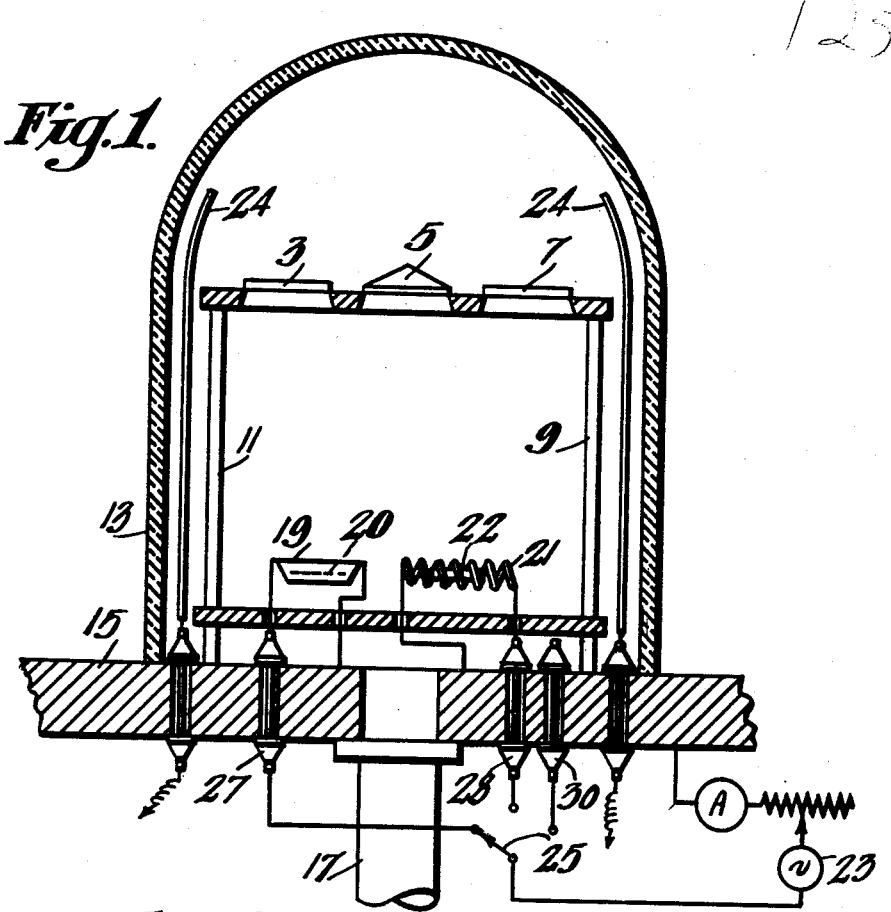
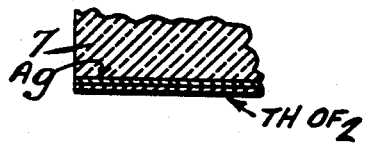
Witness—
F. J. Harbaugh
Inventor
Glenn L. Dimmick
By
Attorney Patented Sept. 16, 1947

2,427,592

UNITED STATES PATENT OFFICE 2,427,592

THORIUM COMPOUND PROTECTIVE COATINGS FOR REFLECTING SURFACES

Glenn L. Dimmick, Indianapolis, Ind., assignor to Radio Corporation of America, a corporation of Delaware Application July 31, 1943, Serial No. 496,929

9 Claims. (Cl. 88—105)

My invention relates to light transparent protecting coatings for reflecting surfaces such as front surface mirrors used in optics, ordinarily made by evaporating in vacuo aluminum or silver upon a glass support base.

An object of my invention is to provide an improved protective coating on a front surface mirror that prevents oxidation and corrosion while having substantially no adverse effect upon the optical properties of the mirror.

Another object of my invention is to provide an improved thin transparent coating for protecting a light reflecting metallic surface from oxidation and corrosion and which is highly durable in regard to abrasion and certain materials such as water, salt spray and alkali vapors.

Heretofore, numerous attempts have been made to apply protective coatings to front surface mirrors, but the materials and process used have resulted either in a coating that adversely affected the desirable optical properties or one that lacked the requirements of durability, chemical and mechanical.

In accordance with my invention, I have provided a thin durable protective coating for a front surface mirror of the aluminum or silver deposited type by evaporating in vacuo a thin film thorium oxy-fluoride upon the mirror surface. Reference is made to my application Ser. No. 464,018, filed October 31, 1942, for a more complete understanding of the nature of my novel coating material.

For a more complete understanding of the invention, reference may be made to the drawings in which, Fig. 1 shows in front elevation a cross sectional view of apparatus, reduced in size, used in carrying out my invention, Fig. 2 is a greatly enlarged sectional view of a front surface mirror embodying the invention, Fig. 3 is also an enlarged sectional view of a front surface mirror embodying a modification of the invention, Fig. 4 is a similar view of a front surface mirror embodying the invention, Fig. 5 is a similar view of a front surface mirror embodying a preferred form of the invention.

Referring to Fig. 1, a plurality of optical devices 3, 5 and 7 are mounted of suitable support structure 9 and 11 within a bell jar 13 supported by and sealed to a flat surface metal slab 15. A vacuum pump apparatus, not shown, is connected through a conduit 17 to an opening in the slab 15. Below the devices to be coated are arranged heating elements 19 and 21 adapted to be selectively connected to an electrical heating source 23 through vacuum tight insulated lead-ins 27 and 28 respectively, and a switch 25. Element 19 is preferably a platinum or molybdenum boat containing thorium oxy-fluoride powder 20, while 21 is a heating coil of tungsten adapted to receive a piece of aluminum 22. When silver is employed, the wire should be of tantalum or molybdenum.

After the desired degree of vacuum has been attained, and the residual gas cleaned up by means of an electrical discharge between magnesium gettering electrodes 24 which also cleans the surfaces of the devices to be coated, the switch 25 is operated to connect the heating source 23 to the boat 19 to heat the thorium compound to a degree causing it to evaporate and deposit upon the exposed surfaces of devices 3, 5 and 7. After a sufficient thickness of a prime layer has been deposited, the heating source is disconnected from boat 19 and connected to heat the coil 21 containing an element 22 of aluminum or silver to cause a layer of aluminum or silver to be deposited. After the desired thickness of the layer has been effected, the heating current is switched back to element 19 to evaporate more of the thorium compound and deposit a superficial protective layer of this material of the order of ¼ wavelength in thickness.

By way of example of an actual application of the foregoing process, a thin mirror surface was formed on the hypotenuse side of a prism which is indicated at 5 in Fig. 1, and in Fig. 2. One boatload of the ThOF₂, probably enough for three and one-half wavelengths thickness of layer, was evaporated onto the surface. Next the aluminum was applied until the evaporating filament could just be seen through the coating. ThOF₂ was then applied on top of the aluminum layer. The prism was removed to an oven, and with others was baked at about 175° C. for forty hours, thereby producing a hard durable coating. Heretofore it has been customary to bake coated elements for a few hours without removing them from the bell jar, but I have found that it is more desirable from a production standpoint to remove such elements from the jar and bake them in an oven under properly controlled thermal conditions.

In adapting the above process to production measured amounts of evaporating material, preferably in the form of pellets for easy handling, are placed in separate heating supports. The amount in each pellet is determined in accordance with the desired thickness of the layer to be deposited by evaporation of the pellet. A time controlled mechanism can be used for sequence operation of the switch 25.

In the above example, the exact thickness of either of the layers of thorium oxy-fluoride is not very critical, but the top and final layer should be at least one-quarter of a wavelength in thickness. The material that is applied directly to the glass does not necessarily have to be thorium oxy-fluoride, but could be zinc sulfide or bismuth fluoride. In such case, a thin layer of thorium oxy-fluoride can to advantage be applied first to the glass to obtain good adhesion before applying the zinc sulfide in that the latter adheres better to the thorium compound than to glass. The thorium compound adheres to glass under unfavorable conditions and seals the glass against water absorption. The aluminum layer is then applied on top of the zinc sulfide and a final layer of the thorium compound applied over the aluminum, as shown in Fig. 3.

I have found, however, that if the glass is good and clean it is not necessary to apply anything to the glass before applying the aluminum layer, and in Fig. 4 I have shown this simplified arrangement, wherein the aluminum layer is deposited directly on the glass base, followed by a top layer at least of the order of one-quarter wavelength of the desired light in thickness of the thorium compound. The latter layer prevents the usual oxidation of the aluminum in that it is applied while still in the vacuum chamber, over the aluminum layer.

In Fig. 5 I have shown the application of my invention to a front surface mirror using a silver layer. Silver films are known to have still better properties than aluminum, as a reflector, as to efficiency, particularly for certain parts of the spectrum. Whereas the oxide protects aluminum films, silver has no such inherent protection and is readily tarnished, making it unsuitable as a front surface mirror when exposed to the atmosphere. I am aware that attempts have been made to overcome this difficulty, reference being made to the highly meritorious text of Strong, "Procedures in Experimental Physics," published by Prentice-Hall, 1939, pages 186 and 187. On page 187 of Strong's book he describes the method of protecting silver films with calcium fluoride (or quartz) and also with a thin film of aluminum which is allowed to oxidize and thus protect the silver with transparent aluminum oxide. Calcium fluoride is not a good material to use as a protection because it is quite fragile and is easily damaged by cleaning it in the normal way. Aluminum oxide is probably a much better material for protecting silver, but it is very difficult to evaporate the oxide itself and if one follows the procedure outlined by Strong, it is only possible to provide a few molecules of aluminum oxide because if a thicker layer of aluminum is deposited, the outer surface will oxidize and prevent oxidation to any appreciable depth. Thorium oxy-fluoride may be evaporated in any thickness desired, is easy to apply and is very effective in its protecting action.

While I prefer to apply my protective coating in vacuum immediately following the deposit of the reflecting material, it can be applied to a mirror which has previously been formed by some process other than the vacuum evaporating method.

The $ThOF_2$ is prepared by heating thorium fluoride $ThF_4 \cdot H_2O$ in a platinum crucible in a vacuum or in an inert gas. When the thorium fluoride is prepared from thorium nitrate and hydrofluoric acid, it takes the tetrahydrated form given above. When this thorium fluoride is heated to 200° C. it gives off three molecules of water forming the monohydrate. If this monohydrate is heated in air to a red heat, it forms thorium oxide and hydrogen fluoride. If, however, the thorium fluoride monohydrate is heated to substantially red heat in a vacuum, the following reaction takes place

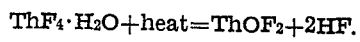
$$ThF_4 \cdot H_2O + heat = ThOF_2 + 2HF.$$

While there is reason to believe that the above compound $ThOF_2$ is formed, it is possible that the water of crystallization is merely driven off, leaving the $ThF_4$, and I do not wish to be restricted to thorium oxy-fluoride when the resulting compound may be thorium fluoride.

The compound comprising thorium and fluorine prepared in this manner is placed in a platinum boat and heated to about 1000 degrees C. in a vacuum or inert atmosphere. I prefer to use the term inert atmosphere to include a vacuum or an inert gas. At this temperature the compound melts and evaporates and it may be evaporated onto the optical surface to an appropriate thickness. The evaporated film of this material after it has been baked for several hours at a temperature of 70° C. or somewhat higher, has a number of advantages over other types of films in that it repels water, it is extremely hard, it has a very low surface friction, it is not soluble in pure water, salt water, or in alkaline solutions, it forms a very good bond with the glass and it is clear and transparent without appreciable absorption in the visible spectrum.

It is obviously unusual to provide a film of such extreme uniform thinness, about five millionths of an inch, that affords such a high degree of protection, while having no undesired optical effects. Protective coatings of lacquer or other water resistant coatings are of course out of the question for precision optical devices because of non-uniformity in thickness and uneven surface, undesired light or color effects, etc. The coating is so effective that when applied to the best optical glass that is too hygroscopic for practical purposes, it seals it against the deleterious effects of water. A sample lens of such material was coated over half its surface with my thorium compound according to my invention, and subjected to a water vapor test. The coated part emerged in perfect condition, while the uncoated part was all corroded and unsuitable for optical purposes. It will be understood that other modifications are possible without departing from the spirit and scope of my invention. My invention, therefore, should not be restricted except in so far as it is necessitated by the prior art and the spirit of the appended claims.

I claim as my invention:

1. In combination, a glass base, a relatively thin layer of an adherence material deposited on said base, a specular reflecting layer deposited upon said layer of adherence material, and a transparent layer of a protecting material deposited upon said reflecting layer, said adherence material and said protecting material being composed of a compound comprising at least thorium and fluorine formed by heating $ThF_4 \cdot H_2O$ at red heat in an inert atmosphere.

2. In combination, a front surface mirror and a superposed transparent layer of a compound comprising at least thorium and fluorine for protecting said mirror against corrosion and abrasion, formed by heating monohydrated thorium tetrafluoride at red heat in an intert atmosphere.

3. In a light-reflecting device, a support base, a layer of high reflecting material on said base forming a specular reflecting surface, and a superposed transparent layer of a compound comprising at least thorium and fluorine, formed by heating monohydrated thorium tetrafluoride at red heat in an inert atmosphere.

4. In combination, a front surface specular light reflector and a transparent layer of a compound comprising at least thorium and fluorine deposited thereon of a thickness at least of the order of one-quarter of a wavelength of the light to be reflected, formed by heating monohydrated thorium tetrafluoride at red heat in an inert atmosphere.

5. In combination, a front surface specular light reflector of a material that is readily affected deleteriously by the atmosphere, and a transparent layer of a compound comprising at least thorium and fluorine over the surface of said reflector, formed by heating monohydrated thorium tetrafluoride at red heat in an inert atmosphere.

6. In combination, a front surface silver mirror and a superposed transparent layer of a compound comprising at least thorium and fluorine for protecting said mirror against corrosion and abrasion, formed by heating monohydrated thorium tetrafluoride at red heat in an inert atmosphere.

7. In combination, a front surface mirror of aluminum, and a superposed transparent layer of a compound comprising at least thorium and fluorine of a thickness at least of the order of one-quarter wavelength of the light to be reflected, formed by heating monohydrated thorium tetrafluoride at red heat in an inert atmosphere.

8. A front surface mirror, comprising a vitreous support base, a layer of metal forming a mirror surface on said base, and a superficial layer of a compound comprising at least thorium and fluorine characterized by resistance to corrosion and abrasion and substantially transparent, formed by heating $ThF_4 \cdot H_2O$ at red heat in an inert atmosphere.

9. The invention as set forth in claim 5 wherein the thickness of said layer is at least of the order of one-quarter wavelength of the light to be reflected.

GLENN L. DIMMICK.

REFERENCES CITED

The following references are of record in the file of this patent:

UNITED STATES PATENTS

| Number | Name | Date |
|---|---|---|
| 2,301,456 | Sabine | Nov. 10, 1942 |
| 2,084,327 | Edwards | June 22, 1937 |
| 2,179,491 | Cain | Nov. 14, 1939 |
| 2,079,784 | Williams | May 11, 1937 |
| 2,237,123 | Teves | Apr. 1, 1941 |
| 2,207,656 | Cartwright | July 9, 1940 |
| 1,675,120 | Marden et al. | June 26, 1928 |
| 2,366,687 | Osterberg | Jan. 2, 1945 |
| 1,487,174 | Marden et al. | Mar. 18, 1924 |
| 2,339,392 | Garner | Jan. 18, 1944 |
| 2,281,474 | Cartwright et al. | Apr. 28, 1942 |

OTHER REFERENCES

Mellor, Treatise on Inorganic and Theoretical Chemistry, vol. 7, page 227, publ. 1927, Longmans, Green & Co., 55 5th Ave., New York.

Thorpe, Dictionary of Applied Chemistry, vol. 5, page 478 (1916).

Strong, Procedures in Experimental Physics, pub. by Prentice-Hall Inc. (1939), pages 186 and 187.